United States Patent
Sethuraman et al.

(10) Patent No.: US 11,012,510 B2
(45) Date of Patent: May 18, 2021

(54) HOST DEVICE WITH MULTI-PATH LAYER CONFIGURED FOR DETECTING TARGET FAILURE STATUS AND UPDATING PATH AVAILABILITY

(71) Applicant: EMC IP Holding Company LLC, Hopkinton, MA (US)

(72) Inventors: Manikandan Sethuraman, Bangalore (IN); Peniel Charles, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/587,907

(22) Filed: Sep. 30, 2019

(65) Prior Publication Data

US 2021/0099521 A1   Apr. 1, 2021

(51) Int. Cl.
| | | |
|---|---|---|
| *G06F 15/16* | (2006.01) | |
| *H04L 29/08* | (2006.01) | |
| *G06F 13/10* | (2006.01) | |
| *H04L 12/26* | (2006.01) | |
| *H04L 12/24* | (2006.01) | |

(52) U.S. Cl.
CPC ........ *H04L 67/1097* (2013.01); *G06F 13/102* (2013.01); *H04L 41/069* (2013.01); *H04L 43/0805* (2013.01)

(58) Field of Classification Search
CPC ............. H04L 67/1097; H04L 65/4053; H04L 41/069; G06F 13/102
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,843,906 B1 * | 11/2010 | Chidambaram .... H04L 67/1097 370/386 |
| 7,843,907 B1 * | 11/2010 | Abou-Emara ...... H04L 49/3045 370/386 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Cheikh T Ndiaye
(74) *Attorney, Agent, or Firm* — Ryan, Mason & Lewis, LLP

(57) ABSTRACT

A host device is configured to communicate over a network with a storage system comprising a plurality of storage devices. The host device comprises a multi-path input-output (MPIO) driver configured to control delivery of input-output (IO) operations from the host device to the storage system over selected ones of a plurality of paths through the network, where the paths are associated with respective initiator-target pairs, and each of a plurality of targets of the initiator-target pairs comprises a corresponding port of the storage system. The MPIO driver is further configured to obtain from the storage system information characterizing failure status of at least a subset of the targets, and to update availability status of the paths based at least in part on the obtained information.

20 Claims, 4 Drawing Sheets

(56) References Cited

U.S. PATENT DOCUMENTS

| | | | |
|---|---|---|---|
| 7,904,681 B1 | 3/2011 | Bappe et al. | |
| 7,925,872 B2 | 4/2011 | Lai et al. | |
| 7,930,583 B1* | 4/2011 | Vemuri | G06F 11/079 714/4.1 |
| 8,301,812 B1* | 10/2012 | Riordan | G06F 13/4022 710/74 |
| 8,825,919 B1 | 9/2014 | Lim et al. | |
| 8,874,746 B1 | 10/2014 | Gonzalez | |
| 8,984,220 B1* | 3/2015 | Gill | H04L 41/0866 711/114 |
| 9,026,694 B1 | 5/2015 | Davidson et al. | |
| 9,400,611 B1 | 7/2016 | Raizen | |
| 9,461,867 B1* | 10/2016 | Atia | H04L 47/125 |
| 9,594,780 B1 | 3/2017 | Esposito et al. | |
| 9,778,852 B1 | 10/2017 | Marshak et al. | |
| 10,353,714 B1 | 7/2019 | Gokam et al. | |
| 2004/0010563 A1 | 1/2004 | Forte et al. | |
| 2005/0188239 A1* | 8/2005 | Golasky | G06F 11/201 714/2 |
| 2006/0277383 A1* | 12/2006 | Hayden | H04L 67/1097 711/170 |
| 2008/0043973 A1 | 2/2008 | Lai et al. | |
| 2011/0197027 A1 | 8/2011 | Balasubramanian et al. | |
| 2011/0296230 A1 | 12/2011 | Chen et al. | |
| 2015/0222705 A1 | 8/2015 | Stephens | |
| 2016/0092136 A1 | 3/2016 | Balakrishnan et al. | |
| 2016/0117113 A1 | 4/2016 | Li et al. | |
| 2016/0197994 A1* | 7/2016 | Nazari | G06F 13/16 709/219 |
| 2016/0335003 A1 | 11/2016 | Ahmed et al. | |
| 2018/0189635 A1 | 7/2018 | Olarig et al. | |
| 2018/0219755 A1* | 8/2018 | Agarwal | H04L 67/1097 |
| 2019/0095299 A1 | 3/2019 | Liu et al. | |
| 2019/0108888 A1 | 4/2019 | Sarkar et al. | |

OTHER PUBLICATIONS

NVM Express, "NVM Express, Revision 1.3," NVM Express, May 1, 2017, 282 pages.

VMWare, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell Emc PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. filed Dec. 21, 2017 and entitled "Storage System with Input-Output Performance Control Utilizing Application Process Detection."

U.S. Appl. No. 15/795,653 filed in the name of Maneesh Pusalkar et al. filed Oct. 27, 2017 and entitled "Storage System with Network-Wide Configurable Device Names.".

U.S. Appl. No. 16/142,274 filed in the name of Sanjib Mallick et al. filed Sep. 26, 2018 and entitled "Host Device with Multi-Path Layer Implementing Automatic Standby Setting for Active-Active Configuration."

VMWare Knowledge Base, "8GB Emulex HBAs May Not React to RSCN Events Properly on Older Firmware Versions," https://kb.vmware.com/s/article/2005235, Sep. 20, 2013, 1 page.

Netapp Knowledge Base, "SAN Host Does Not Failover I/O to Alternate Paths When One or More Paths Are Removed and an RSCN Is Not Received," https://kb.netapp.com/app/answers/answer_view/a_id/1074454/~/san-host-does-not-failover-i%2Fo-to-alternate-paths-when-one-or-more-paths-are, Nov. 11, 2018, 3 pages.

Redhat, "Device-Mapper-Multipath on RHEL5 Experiences Excessive Delay in Detecting a Lost Path from a Storage Failure that Produces No RSCN or Loop/Link Error," https://access.redhat.com/solutions/23576, Mar. 21, 2014, 2 pages.

Qlogic Corporation, "Release Notes," ftp://supermicro.com/driver/Broadcom/B57BCMCD_T7.12b.4.1/Windows_64/FCoE/release.txt, 2014, 10 pages.

* cited by examiner

HOST DEVICE WITH MULTI-PATH LAYER CONFIGURED FOR DETECTING TARGET FAILURE STATUS AND UPDATING PATH AVAILABILITY

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operations for delivery to the storage system. In the event of a failure in a storage system port, different host devices may learn of the failure at different times. For example, host devices with active IO operations that are in the process of being delivered to the storage system may learn of the failure relatively quickly, while those without such active IO operations can take substantially longer to learn of the failure. Although certain types of failures can trigger the generation of registered state change notifications (RSCNs) for delivery to the host devices, it is possible that such messages may not be received by at least one of the host devices, or received only after substantial delay. Similarly, different ones of the host devices can learn of restoration of a previously-failed port at different times, and again in some cases only after significant delays. These delays in learning of port failure and restoration by some host devices sharing a storage system can adversely impact important functions of the host devices such as load balancing and failover policy execution, leading to sub-optimal performance.

SUMMARY

Illustrative embodiments configure a multi-path layer of one or more host devices to include functionality for detecting target failure status and updating path availability in conjunction with communication with a storage array or other type of storage system via a storage area network (SAN) or other type of network. The multi-path layer illustratively comprises at least one multi-path input-output (MPIO) driver configured to process IO operations of at least one host device. Configuring MPIO drivers of multiple host devices to implement target failure status detection and associated path availability updates as disclosed herein can ensure that all of the host devices learn of port failure and restoration quickly and efficiently. As a result, these host devices can provide improved load balancing and failover policy execution, leading to enhanced overall system performance.

In one embodiment, an apparatus comprises a host device configured to communicate over a network with a storage system comprising a plurality of storage devices. The host device comprises an MPIO driver configured to control delivery of IO operations from the host device to the storage system over selected ones of a plurality of paths through the network, where the paths are associated with respective initiator-target pairs, and each of a plurality of targets of the initiator-target pairs comprises a corresponding port of the storage system. The MPIO driver is further configured to obtain from the storage system information characterizing failure status of at least a subset of the targets, and to update availability status of the paths based at least in part on the obtained information.

The information characterizing failure status of at least a subset of the targets in some embodiments comprises information stored in the form of at least one sense page maintained by the storage system. The sense page comprises a plurality of entries with each such entry comprising an identifier of a corresponding one of the targets and failure status information for that target. The failure status information illustratively indicates whether the target has a failed status or a non-failed status. For example, the failed status and non-failed status may comprise respective logged-in and logged-out statuses. A wide variety of other types of failure status information can be used in other embodiments, and the term "failure status" as used herein is therefore intended to be broadly construed.

Such information obtained from the storage system and characterizing failure status of at least a subset of the targets is illustratively stored in a data structure of a kernel-space portion of the MPIO driver, or elsewhere in the host device, although other types of host device storage arrangements can be used.

In some embodiments, obtaining from the storage system information characterizing failure status of at least a subset of the targets comprises sending at least one command from the host device to the storage system, and receiving the information from the storage system in response to said at least one command. The command can comprise at least one vendor unique command of a designated storage protocol. As another example, the command can comprise a log sense command or other similar command of an iSCSI or NVMe storage protocol. Numerous other commands and storage protocols can be used in other embodiments. The sending of at least one command may be repeated periodically in accordance with a specified period so as to repeatedly obtain current target failure status information from the storage system.

In some embodiments, updating availability status of the paths based at least in part on the obtained information illustratively comprises identifying one or more of the targets having a failed status, and temporarily eliminating from consideration in a path selection algorithm of the MPIO driver any of the paths that are associated with the one or more targets identified as having the failed status.

Additionally or alternatively, updating availability status of the paths based at least in part on the obtained information illustratively comprises identifying one or more of the targets that previously had a failed status but no longer have that status, and reversing the temporary elimination from consideration in the path selection algorithm of the multi-path input-output driver any of the paths that are associated with the one or more targets identified as no longer having the failed status.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
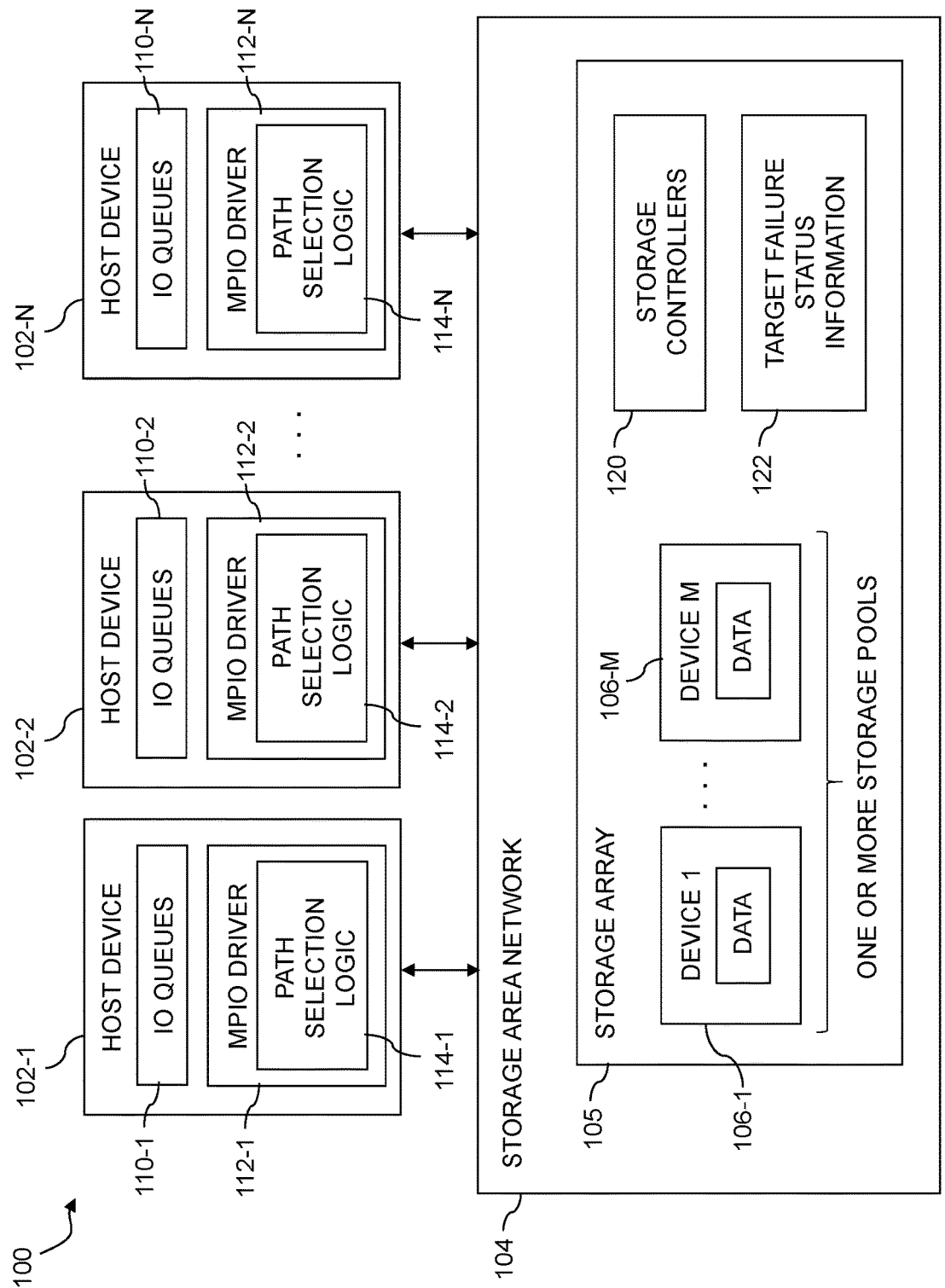
FIG. 1 is a block diagram of an information processing system configured with functionality for detecting target failure status and updating path availability utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for target failure status detection and path availability update. Such functionality is provided at least in part using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for target failure status detection and path availability update. Other types of MPIO drivers from other driver vendors may be suitably modified to incorporate functionality for target failure status detection and path availability update as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to obtain from the storage array 105 information characterizing failure status of at least a subset of the targets, and to update availability status of the paths based at least in part on the obtained information. The updated path availabilities are then utilized in path selection operations performed by the path selection logic 114-1. For example, paths having non-available status are illustratively excluded from consideration by a path selection algorithm, as their corresponding targets were detected as having a failed status, until such time as the status of those path changes to available based on a detected clearing of the corresponding target failure by the storage array 105.

Although the targets illustratively comprise respective ports of the storage array 105 in this embodiment, other types of targets can be used in other embodiments. In some embodiments, each of the ports more particularly comprises a front-end adaptor of the storage array 105, although the term "port" as used herein is intended to be broadly construed and should not be viewed as being limited to front-end adapters.

Additional examples of target failure status detection and path availability update are described below in conjunction with the embodiments of FIGS. 2 through 4.

In the FIG. 1 embodiment, the storage array 105 comprises a plurality of storage controllers 120 and one or more instances of target failure status information 122. A more detailed example of the target failure status information 122 will be described below in conjunction with the embodiment of FIG. 4.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The target failure status information 122 maintained in the storage array 105 and obtained by the MPIO driver 112-1 illustratively comprises at least one sense page maintained by the storage array 105. The sense page comprises a plurality of entries with each such entry comprising an identifier of a corresponding one of the targets and failure status information for that target, with the failure status information indicating whether the target has a failed status or a non-failed status. For example, the failure status information can list all failed targets and/or all non-failed targets. In some embodiments, only failed targets are listed, with the understanding being that all other targets are non-failed, or vice-versa. The term "sense page" as used herein is intended to be broadly construed, and generally refers to a designated set of information that can be read from the storage array 105 using a sense command. For example, a log sense page of the storage array 105 can be read using a log sense command.

Similar information is obtained from the storage array 105 by the other MPIO drivers 112 of respective other ones of the host devices 102. Such information is illustratively referred to herein as "target failure status information," and can take on a wide variety of different formats in different embodiments.

The above-noted target failure status information is illustratively obtained by the MPIO driver 112-1 and stored in one or more data structures of a kernel-space portion of the MPIO driver 112-1. The kernel-space portion of the MPIO driver 112-1 is illustratively part of an operating system of the host device 102-1. Alternatively, other components of the host device 102-1 can be involved in storage of the target failure status information for the storage array 105, possibly using other types of data structures or storage arrangements.

The information can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format, including, also by way of example, an NVMe format of a type described elsewhere herein.

Additionally or alternatively, the information can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection.

In some embodiments, in obtaining from the storage array 105 the information characterizing failure status of at least a subset of a plurality of targets, the MPIO driver 112-1 establishes a first time period, and repeats the obtaining operation in each of a plurality of successive instances of the first time period. The MPIO driver 112-1 thereby repeatedly obtains from the storage array 105 for each such instance the latest version of the target failure status information.

Thus, sending at least one command from the host device 102-1 to the storage array 105 illustratively comprises repeating the sending of the command or commands periodically in accordance with a specified period so as to repeatedly obtain current target failure status information from the storage array 105.

A wide variety of different path selection arrangements can be implemented using updated path availabilities that are determined based at least in part on the obtained target failure status information.

In selecting paths for delivery of IO operations, the path selection logic 114-1 utilizes updated path availabilities determined based at least in part on the target failure status information obtained from the storage array 105. For example, some paths can have an availability status that indicates that those paths are available because their respective targets are currently in a non-failed state, while other paths can have an availability status that indicates that those paths are not available because their respective targets are currently in a failed state. Only those paths having an availability status that indicates that the paths are available are candidates for possible selection by a path selection algorithm implemented by the path selection logic 114-1.

Accordingly, updating availability status of the paths based at least in part on the obtained information in some embodiments comprises identifying one or more of the targets having a failed status, and temporarily eliminating from consideration in a path selection algorithm of the MPIO driver 112-1 any of the paths that are associated with the one or more targets identified as having the failed status.

Similarly, updating availability status of the paths based at least in part on the obtained information can further comprise identifying one or more of the targets that previously had a failed status but no longer have that status, and reversing the temporary elimination from consideration in the path selection algorithm of the MPIO driver 112-1 any of the paths that are associated with the one or more targets identified as no longer having the failed status.

These and other functions related to target failure status detection and path availability update that are referred to herein as being performed by or under the control of the MPIO driver 112-1 can in some embodiments be performed at least in part outside of the MPIO driver 112-1, such as in the host device 102-1 generally.

References herein to an MPIO driver such as MPIO driver 112-1 being configured to obtain, store and utilize target failure status information or other related information for path availability update purposes are intended to be broadly construed, and should not be viewed as being limited to any particular storage arrangement, such as storage in a particular host device component or using a particular format. Accordingly, such storage can be in a memory or other storage device that is outside of the MPIO driver.

It is also to be appreciated that the term "target failure status information" as used herein is intended to be broadly construed, as so to encompass a wide variety of different types of stored information and associated storage arrangements for failed or non-failed indicators or other similar information of a storage array or other storage system, including without limitation online or offline indicators. For example, although the targets comprise respective ports of a storage array in some embodiments, other embodiments can implement similar functionality for other types of targets.

As indicated previously, absent use of the techniques for target failure status detection and path availability update in a multi-path layer as disclosed herein, performance of the storage system in processing IO requests received from a host device can be adversely impacted when different host devices learn of failure of a storage array port at different times, and in some cases only after significant delays, possibly due to some host devices having active IO operations and others not having active IO operations. Similarly, different ones of the host devices can learn of restoration of a previously-failed port at different times, and again in some cases only after significant delays. These delays in learning of port failure and restoration by some host devices sharing a storage system can adversely impact important functions of the host devices such as load balancing and failover policy execution, leading to sub-optimal performance.

Such drawbacks are advantageously overcome in illustrative embodiments herein by utilization of a multi-path layer comprising one or more of the MPIO drivers 112 to provide target failure status detection and path availability update as described above. These embodiments therefore provide a significant advance over conventional techniques that do not take detected target failure status and update path availability into account in path selection. For example, illustrative embodiments are advantageously configured to ensure that all of the host devices learn of port failure and restoration quickly and efficiently. As a result, these host devices can provide improved load balancing and failover policy execution, leading to enhanced overall system performance.

The above-described functions associated with target failure status detection and path availability update in the MPIO driver 112-1 are carried out at least in part under the control of its path selection logic 114-1. For example, the path selection logic 114-1 is illustratively configured to control performance of an algorithm comprising the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for target failure status detection and path availability update.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support target failure status detection and path availability update.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. patent application Ser. No. 15/849,828, filed Dec. 21, 2017 and entitled "Storage System with Input-Output Performance Control Utilizing Application Process Detection," now issued as U.S. Pat. No. 10,474,367, which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
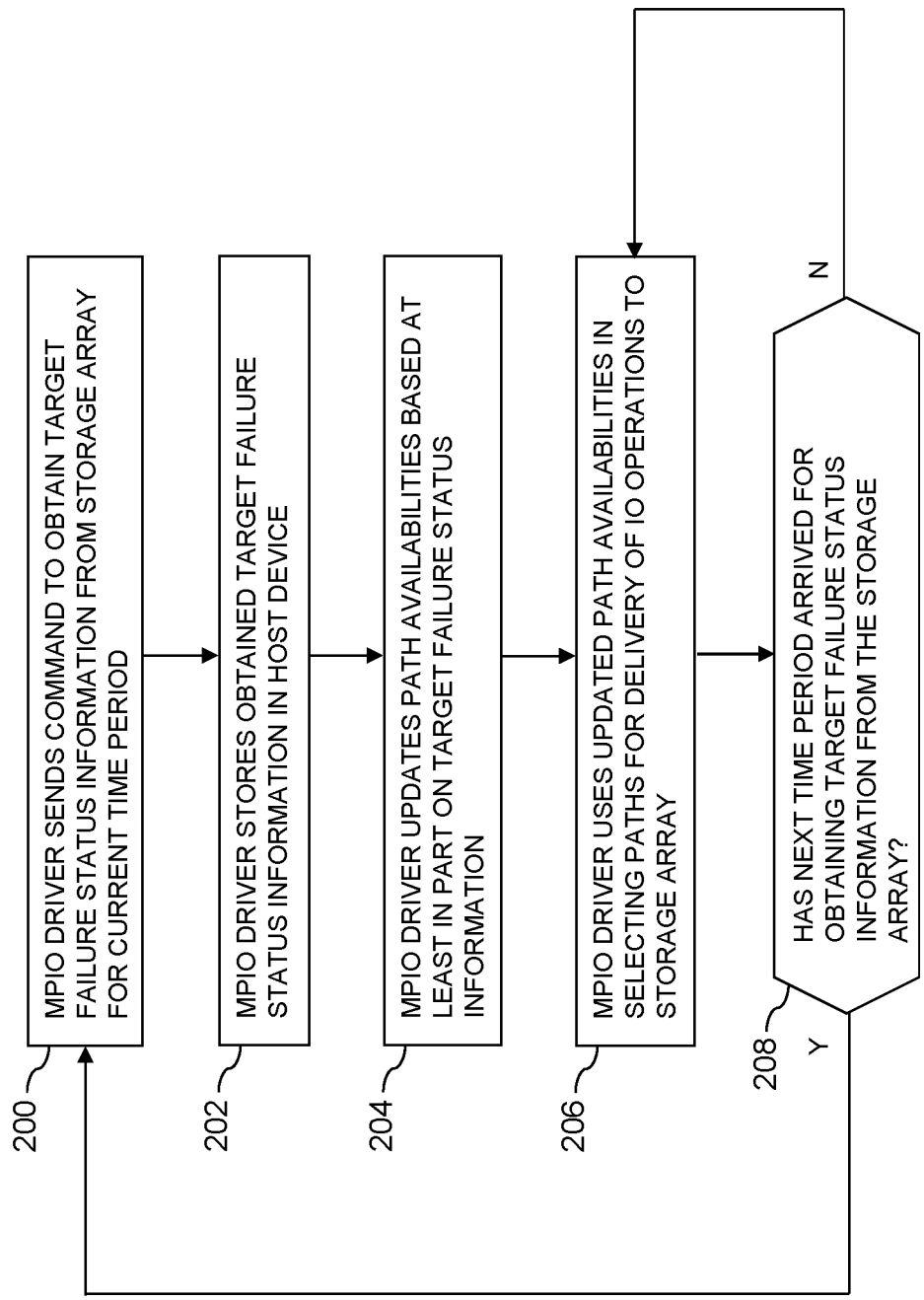
FIG. 2 is a flow diagram of a process for detecting target failure status and updating path availability utilizing a multi-path layer of a host device in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Accordingly, the FIG. 2 process may be viewed as an example of an algorithm performed by the path selection logic 114-1 of the MPIO driver 112-1 of host device 102-1. Other arrangements of host device components and/or other system components can be configured to perform at least portions of one or more of the steps in other embodiments.

In step 200, the MPIO driver sends a command to the storage array to obtain target failure status information from the storage array for a current time period. As indicated elsewhere herein, the command can comprise one or more log sense commands or other similar commands configured to read one or more log sense pages or other arrangements of stored target failure status information from the storage array.

In step 202, the MPIO driver stores the obtained target failure status information in the host device.

In step 204, the MPIO driver updates path availabilities for respective ones of a plurality of paths based at least in part on the obtained target failure status information.

In step 206, the MPIO driver uses the updated path availabilities in selecting paths for delivery of IO operations to the storage array. A given such IO operation is illustratively generated by a process of an application running on the host device, and is queued in a given one of the IO queues of the host device with other operations generated by other processes of that application, and possibly other processes of other applications, for path selection using updated path availabilities as disclosed herein.

In step 208, a determination is made as to whether or not the next time period has arrived for obtaining target failure status information from the storage array. If the next time period for obtaining target failure status information has arrived, the process returns to step 200 as indicated in order to obtain that information from the storage array. Otherwise, the process returns to step 206 to continue to process IO operations for delivery to the storage array, using the computed effective permissible IOPS in selecting paths for delivery of the IO operations, in the manner previously described.

Multiple additional instances of the FIG. 2 process may be performed in respective additional host devices that share the storage array. Other embodiments can include multiple storage arrays, with the disclosed functionality for target failure status detection and path availability update being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for target failure status detection and path availability update. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different target failure status detection and path availability update arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
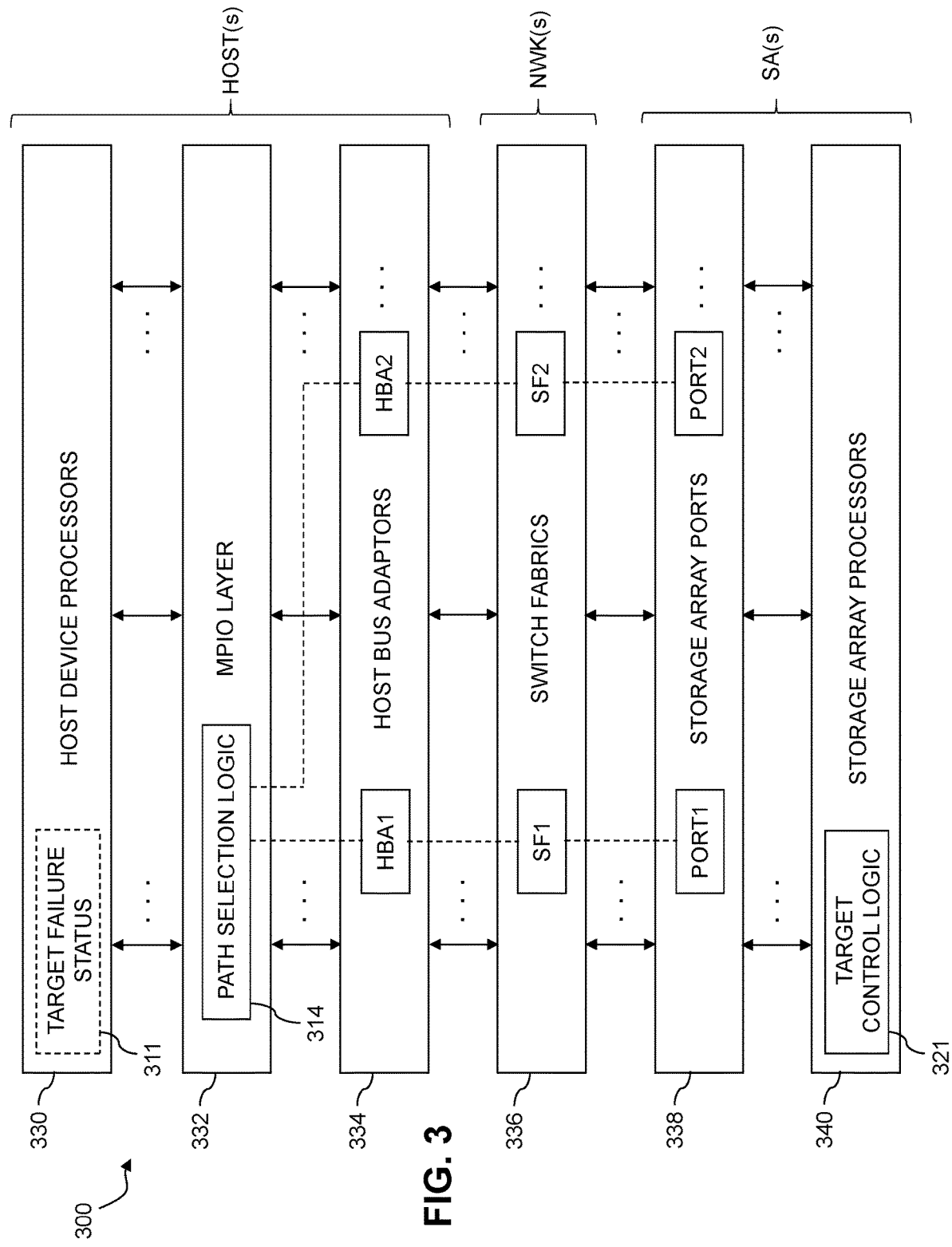
FIG. 3 is a block diagram showing multiple layers of a layered system architecture that includes a multi-path layer with functionality for detecting target failure status and updating path availability in an illustrative embodiment.

Referring now to FIG. 3, another illustrative embodiment is shown. In this embodiment, an information processing system 300 comprises one or more instances of target failure status information 311, path selection logic 314 and target control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements target failure status detection and path availability update functionality using stored target failure status information 311 that is read from one or more storage arrays. The target failure status information 311 is illustratively shown as part of one or more host device processors of the host device processor layer 330. Again, a wide variety of other target failure status information storage arrangements are possible, and the target failure status information 311 is therefore shown in dashed outline in the figure. For example, the target failure status information 311 in other embodiments is illustratively stored entirely in the MPIO layer 332. It is therefore possible in some embodiments that the target failure status information 311 can be stored utilizing a component of the MPIO layer 332, such as within a data structure of the path selection logic 314.

The target failure status information 311 illustratively comprises information obtained from a storage array for use in providing path availability updates and associated path selection for delivery of IO operations in the manner disclosed herein. For example, the target failure status information 311 of the host device processor layer 330 in this embodiment illustratively comprises information obtained by a host device, such as one or more pages of target failure status information 122 read from the storage array 105, possibly supplemented with additional information computed or otherwise determined by the host device.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for target failure status detection and path availability update substantially as previously described. Additional or alternative layers and path selection logic arrangements can be used in other embodiments.

The target control logic 321 implemented in the storage array processor layer 340 controls the configuration and operation of ports of one or more storage arrays. For example, the target control logic 321 can include functionality for controlling a plurality of ports of a given storage array of the system 300. It is also possible in some embodiments that the target control logic 321 can include multiple distinct target control logic instances for multiple sets of targets of respective ones of a plurality of storage arrays of the system 300. Such target control logic instances can be used, for example, to collect target failure status information within one or more storage arrays and to make such information available to one or more host devices for use in path availability update and associated path selection.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths, the path selection logic 314 utilizes updated path availabilities determined based at least in part on the target failure status information 311. For example, some paths can have an availability status that indicates that those paths are available because their respective targets are currently in a non-failed state, while other paths can have an availability status that indicates that those paths are not available because their respective targets are currently in a failed state. Only those paths having an availability status that indicates that the paths are available are candidates for possible selection by a path selection algorithm implemented by the path selection logic 314.

It is assumed in this embodiment that the host devices through their respective MPIO drivers and respective instances of path selection logic 314 provide functionality for target failure status detection and path availability update, possibly with involvement of other host device components.

Accordingly, the path selection logic 314 utilizes updated path availabilities based at least in part on the target failure status information 311 in determining appropriate paths over which to send particular IO operations to ports of one or more storage arrays. As described elsewhere herein, performing such port selection based at least in part on detected target failure status information can substantially improve system performance.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides the disclosed target failure status detection and path availability update functionality, under the control of a corresponding instance of path selection logic implemented in the MPIO driver, possibly with involvement of one or more other host device components.

Figure 4:
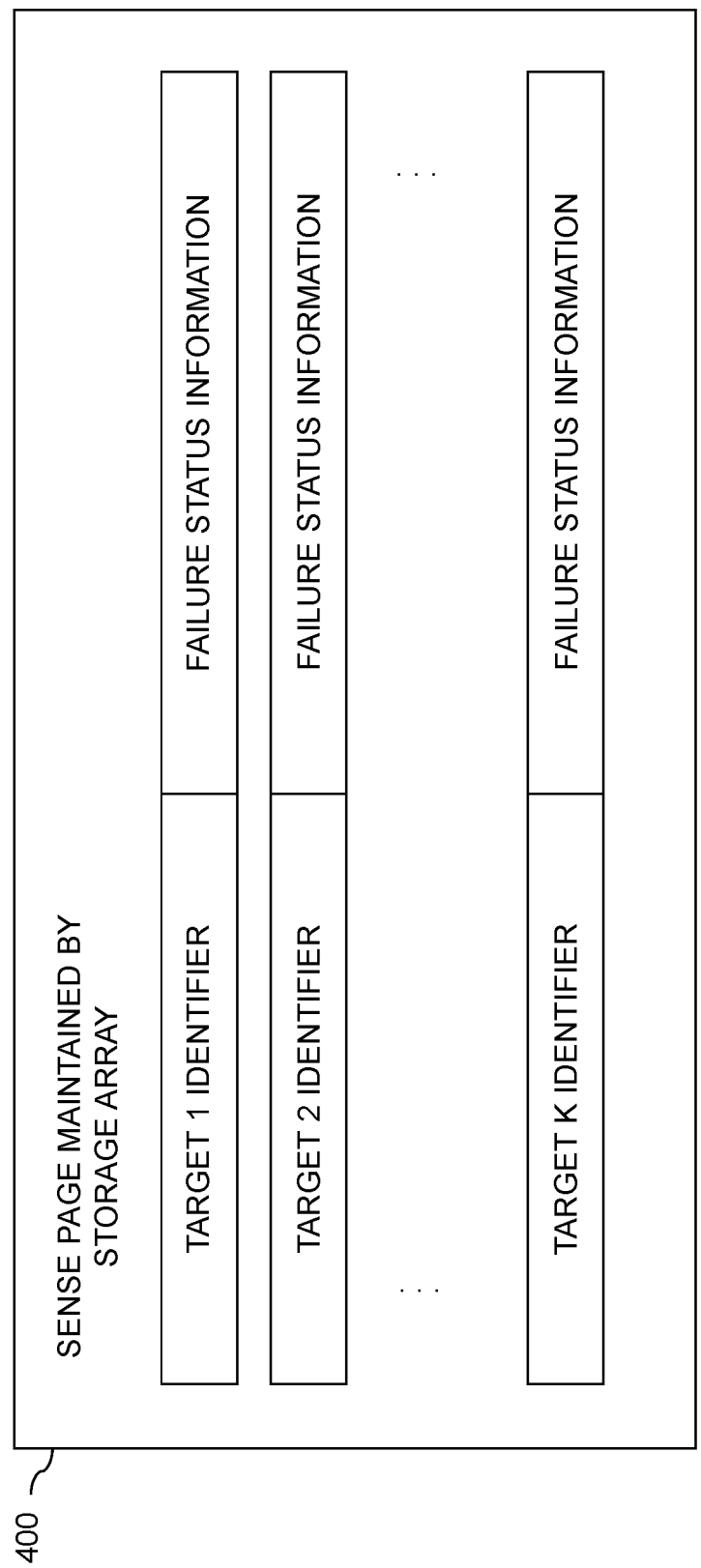
FIG. 4 shows an example of a sense page maintained by a storage array to include current failure status for each of a plurality of targets in an illustrative embodiment.

FIG. 4 shows an example of target failure status information 400 maintained by a storage array in an illustrative embodiment. The target failure status information 400 in this embodiment includes a sense page that is readable by a host device using a sense command, such as a log sense command, of a storage protocol. The sense page in the present embodiment is illustratively maintained in the form of a table, although other types of data structures can be used in other embodiments. Such information is requested from or otherwise obtained from the storage array by one or more host devices, and may comprise target failure status information 122 of storage array 105.

The target failure status information 400 is illustratively obtained from the storage array 105 by a multi-path layer of one or more of the host devices 102. The target failure status information 400 in this embodiment comprises a plurality of entries for different ones of the targets of the storage array 105, with each such entry comprising a target identifier and failure status information for the target. The targets illustratively comprise respective ports of the storage array 105. The targets are denoted in the figure as Target 1, Target 2, . . . Target K, and have their respective identifiers in a first column of the table of FIG. 4. Numerous other types and arrangements of entries and fields can be used, and the term "target failure status information" as used herein is therefore intended to be broadly construed. Such information once obtained from the storage array 105 by a host device, can be stored in a data structure of a multi-path layer of the host device and/or in other data structures elsewhere in the host device.

As a more particular example, a particular log sense command has a designated operation code ("opcode") such as 0x4D, and identifies within a page code field of the command a particular sense page to be read. The sense page to be read is identified by a particular page code inserted in the page code field, such as 0x32. The storage array maintains the sense page having that particular page code, and updates it any time there is a change in the failure status of any of its ports. The failure status information illustratively occupies a particular portion of the sense page, such as a 64-byte portion occupying bytes 10 through 73 of the sense page. Other information in the sense page illustratively includes a page length, a parameter header and a version. Again, numerous alternative page arrangements, including features such as opcodes, page code fields and failure status information portions, can be used.

Other illustrative embodiments include algorithms performed by path selection logic of the MPIO driver, possibly in cooperation with other host device components. Such an embodiment can be configured, for example, to utilize a log sense command to read a sense page from the storage array that indicates the current failure status of all of the ports of the storage array. The storage array illustratively updates the sense page in real time or near real time as changes in target failure status occur.

In some embodiments, the log sense command more particularly comprises a VU command that when sent to any non-failed port or other front-end adaptor of a storage array will return the failure status of all of the other ports. This can involve listing in a response to the command only those ports having a failed status, as it can be understood by the requesting host device that other ports not so listed are assumed to have a non-failed status. The target failure status information therefore need not explicitly indicate the failure status of each port, but can instead only identify the failed ports. As another example, it is possible to identify only the non-failed ports, with the understanding being that any ports that are not identified as such are assumed to have a failed status.

Accordingly, the term "target failure status information" as used herein is intended to be broadly construed, so as to include, for example, an indication for each of a plurality of ports as to whether that port is online or offline. Such target failures can be due to a variety of different causes, from a disconnected cable to any of a variety of hardware or software issues, but regardless of the particular cause a given such failure can be quickly detected by the storage array. The storage array can then immediately update the corresponding target failure status information, as captured in the above-noted log sense page, so as to make that information available to all requesting host devices.

The MPIO drivers of the respective host devices utilize the above-described target failure status information, illustratively obtained periodically via issuance of respective log sense commands or other similar commands, to achieve faster failure detection and faster path restoration than would otherwise be possible if instead the host devices were to rely on RSCNs or other similar messages. Similarly, when the failure of a given target is cleared, the host devices can quickly and uniformly become aware of the corresponding change in the failure status of that target, and can update their path availabilities accordingly.

The particular features and functionality of the illustrative embodiments described above can be varied in other embodiments.

Also, as mentioned previously, different instances of the above-described algorithms and other target failure status detection and path availability update techniques can be performed by different MPIO drivers in different host devices.

The particular target failure status detection and path availability update arrangements described above are therefore presented by way of illustrative example only. Numerous alternative arrangements of these and other features can be used in implementing the target failure status detection and path availability update in other illustrative embodiments.

The illustrative embodiments disclosed herein can provide a number of significant advantages relative to conventional arrangements.

For example, some embodiments configure a multi-path layer of one or more host devices to include functionality for target failure status detection and path availability update. Such functionality ensures that multiple host devices can each learn about target failures in a timely manner, thereby avoiding any problems that would otherwise be associated with delayed receipt of RSCNs or other similar failure communications.

More particularly, configuring MPIO drivers of multiple host devices to implement target failure status detection and associated path availability updates as disclosed herein can ensure that all of the host devices learn of port failure and restoration quickly and efficiently. As a result, these host devices can provide improved load balancing and failover policy execution, leading to enhanced overall system performance.

For example, in some embodiments, delays in path restoration times of one or more host devices are significantly reduced, regardless of whether or not those host devices currently have active IO operations. Illustrative embodiments can therefore provide substantially uniform path restoration times across multiple host devices, independent of current levels and types of IO activity on those host devices.

These and other embodiments are applicable to a wide variety of different storage protocols, including, by way of example, iSCSI and other SCSI protocols, and NVMe protocols of various types.

Additionally or alternatively, illustrative embodiments can avoid drawbacks of conventional approaches such as the Internet Storage Name Service (iSNS) utilized in conjunction with iSCSI. For example, processing of State Change Notifications in iSNS introduce additional configuration requirements that are unduly complex. Embodiments disclosed herein can avoid the need for iSNS and its associated complexity.

As is apparent from the above, some embodiments herein leverage a multi-path layer of one or more host devices to provide enhanced performance in processing of IO operations directed to one or more storage arrays or other types of storage systems.

These and other arrangements are advantageously configured to provide efficient target failure status detection and path availability update even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated target failure status detection and path availability update arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  a host device configured to communicate over a network with a storage system comprising a plurality of storage devices, the host device being implemented external to the storage system;
  the host device comprising:
  a multi-path input-output driver configured to control delivery of input-output operations from the host device to the storage system over selected ones of a plurality of paths through the network;
  the paths being associated with respective initiator-target pairs wherein each of a plurality of targets of the initiator-target pairs comprises a corresponding port of the storage system;
  wherein the multi-path input-output driver is further configured:
  to obtain from the storage system information characterizing failure status of at least a subset of the targets; and
  to update availability status of the paths based at least in part on the obtained information;
  wherein obtaining from the storage system information characterizing failure status of at least a subset of the targets comprises:
  sending at least one command from the host device to the storage system; and
  receiving the information from the storage system in response to said at least one command;
  wherein the at least one command comprises at least one sense command; and
  wherein the information characterizing failure status of at least a subset of the targets comprises information maintained by the storage system as part of at least one sense page, at least portions of the sense page being obtained in response to the at least one sense command, the sense page comprising a plurality of entries with each such entry comprising an identifier of a corresponding one of the targets and failure status information for that target, the failure status information for the target indicating whether the target has a failed status or a non-failed status.

2. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

3. The apparatus of claim 1 wherein the storage devices comprise respective logical storage volumes of the storage system.

4. The apparatus of claim 1 wherein each of the initiators comprises a corresponding host bus adaptor of the host device.

5. The apparatus of claim 1 wherein each of the ports comprises a front-end adaptor.

6. The apparatus of claim 1 wherein said at least one sense command comprises at least one vendor unique command of a designated storage protocol.

7. The apparatus of claim 1 wherein said at least one sense command comprises at least one sense command of a designated storage protocol.

8. The apparatus of claim 1 wherein said at least one sense command comprises at least one command in one of a Small Computer System Interface (SCSI) storage protocol and a non-volatile memory express (NVMe) storage protocol.

9. The apparatus of claim 1 wherein sending at least one command from the host device to the storage system comprises repeating the sending of said at least one command periodically in accordance with a specified period so as to repeatedly obtain current target failure status information from the storage system.

10. The apparatus of claim 1 wherein updating availability status of the paths based at least in part on the obtained information comprises:
   identifying one or more of the targets having a failed status; and
   temporarily eliminating from consideration in a path selection algorithm of the multi-path input-output driver any of the paths that are associated with the one or more targets identified as having the failed status.

11. The apparatus of claim 10 wherein updating availability status of the paths based at least in part on the obtained information comprises:
   identifying one or more of the targets that previously had a failed status but no longer have that status; and
   reversing the temporary elimination from consideration in the path selection algorithm of the multi-path input-output driver any of the paths that are associated with the one or more targets identified as no longer having the failed status.

12. The apparatus of claim 1 wherein the information obtained from the storage system and characterizing failure status of at least a subset of the targets is stored in a data structure of a kernel-space portion of the multi-path input-output driver.

13. A method comprising:
   configuring a multi-path input-output driver of a host device to control delivery of input-output operations from the host device to a storage system over selected ones of a plurality of paths through a network, the host device being implemented external to the storage system;
   the paths being associated with respective initiator-target pairs wherein each of a plurality of targets of the initiator-target pairs comprises a corresponding port of the storage system;
   the multi-path input-output driver:
   obtaining from the storage system information characterizing failure status of at least a subset of the targets; and
   updating availability status of the paths based at least in part on the obtained information;
   wherein obtaining from the storage system information characterizing failure status of at least a subset of the targets comprises:
   sending at least one command from the host device to the storage system; and
   receiving the information from the storage system in response to said at least one command;
   wherein the at least one command comprises at least one sense command; and
   wherein the information characterizing failure status of at least a subset of the targets comprises information maintained by the storage system as part of at least one sense page, at least portions of the sense page being obtained in response to the at least one sense command, the sense page comprising a plurality of entries with each such entry comprising an identifier of a corresponding one of the targets and failure status information for that target, the failure status information for the target indicating whether the target has a failed status or a non-failed status.

14. The method of claim 13 wherein updating availability status of the paths based at least in part on the obtained information comprises:
   identifying one or more of the targets having a failed status; and
   temporarily eliminating from consideration in a path selection algorithm of the multi-path input-output driver any of the paths that are associated with the one or more targets identified as having the failed status.

15. The method of claim 13 wherein said at least one sense command comprises at least one vendor unique command of a designated storage protocol.

16. A computer program product comprising a non-transitory processor-readable storage medium having stored therein program code of one or more software programs, wherein the program code, when executed by a host device comprising a multi-path input-output driver, the host device being implemented external to a storage system and configured to communicate over a network with the storage system, causes the multi-path input-output driver:
   to control delivery of input-output operations from the host device to the storage system over selected ones of a plurality of paths through the network;
   the paths being associated with respective initiator-target pairs wherein each of a plurality of targets of the initiator-target pairs comprises a corresponding port of the storage system;
   to obtain from the storage system information characterizing failure status of at least a subset of the targets; and
   to update availability status of the paths based at least in part on the obtained information;
   wherein obtaining from the storage system information characterizing failure status of at least a subset of the targets comprises:
   sending at least one command from the host device to the storage system; and
   receiving the information from the storage system in response to said at least one command;
   wherein the at least one command comprises at least one sense command; and
   wherein the information characterizing failure status of at least a subset of the targets comprises information maintained by the storage system as part of at least one sense page, at least portions of the sense page being obtained in response to the at least one sense command, the sense page comprising a plurality of entries with each such entry comprising an identifier of a corresponding one of the targets and failure status information for that target, the failure status information for the target indicating whether the target has a failed status or a non-failed status.

17. The computer program product of claim 16 wherein updating availability status of the paths based at least in part on the obtained information comprises:
   identifying one or more of the targets having a failed status; and temporarily eliminating from consideration in a path selection algorithm of the multi-path input-output driver any of the paths that are associated with the one or more targets identified as having the failed status.

18. The computer program product of claim 17 wherein updating availability status of the paths based at least in part on the obtained information comprises:
identifying one or more of the targets that previously had a failed status but no longer have that status; and
reversing the temporary elimination from consideration in the path selection algorithm of the multi-path input-output driver any of the paths that are associated with the one or more targets identified as no longer having the failed status.

19. The computer program product of claim 16 wherein the information obtained from the storage system and characterizing failure status of at least a subset of the targets is stored in a data structure of a kernel-space portion of the multi-path input-output driver.

20. The computer program product of claim 16 wherein said at least one sense command comprises at least one vendor unique command of a designated storage protocol.

\* \* \* \* \*